United States Patent Office 3,262,796
Patented July 26, 1966

3,262,796
BURNED IMPREGNATED BRICK
Ernest Paul Weaver and Ben Davies, Pittsburgh, Pa., assignors to Harbison-Walker Refractories Company, Pittsburgh, Pa., a corporation of Pennsylvania
No Drawing. Filed Jan. 14, 1965, Ser. No. 425,999
6 Claims. (Cl. 106—58)

This invention relates to burned, impregnated brick. More particularly, this invention relates to tar or pitch-impregnated ceramically bonded refractory shapes.

This invention has particular application to impregnated, burned basic refractory brick suitable for use in fabricating the working lining of furnaces used in the production of steel by the oxygen blowing process, variously referred to as the LD Process, the oxygen converter or, generally, simply as oxygen steel-making.

"Basic refractories" means, to those skilled in the art, refractories fabricated of dead burned magnesite, dead burned dolomite, hard burned lime, sometimes with additions of chrome ore (which is not, strictly speaking, basic in nature), olivine, forsterite, and the like. While we refer to dead burned magnesite and dead burned dolomite it is, of course, understood by those skilled in the art that we are referring to materials which have been burned to a sufficiently high temperature to drive off combined water and carbon dioxide and to form a stable form of the oxide MgO in the case of magnesite, or a stable mixture of the oxide CaO and MgO in the case of dolomite.

While the invention has particular applicability to basic refractories, it has equal utility for other classes of ceramically bonded refractory; for example, high alumina refractories, fireclay refractories, silica refractories, zirconia refractories, silicon carbide refractories, and other known refractory oxides and combinations thereof.

It has been common to tar or pitch-impregnate certain different types of burned refractory to increase their resistance to chemical and physical attack in ferruginous environmets. The manner in which the impregnation has previously been carried out, and the selection of the particular pitch or tar to be used, has been a somewhat hit-or-miss operation, due to varying densities from shape to shape, various sizes of shapes, moisture content of shapes, volatility and viscosity of heated pitches, when it has been necessary to heat them to make them fluid, due to loss of volatiles, etc.

One distressing characteristic of many prior tar-impregnation procedures, and of the resulting tar-impregnated product, has been a heavy buildup of tar scum deposits over exterior surfaces of the brick. The cause of this buildup has not previously been fully understood. It has been theorized that use of too low a softening point pitch causing sticky and tacky surfaces and buildup of residue, could have been a cause. Of course, these sticky and tacky surfaces prevented easy palletization and, later, separation from a pallet or from each other. Another distressing characteristic of such brick is that, for service, the brick either had to be ground or scraped or, in some manner, sized to obtained square corners, good surfaces and uniform size dimensions so they could be laid up properly. Even then, if the remaining surface coating or scum was too thick, as the environment temperature became sufficiently high to melt the pitch scum, that scum served as a lubricant allowing brick to slip out of position. Even if the brick remains in place the refractory construction is loose allowing infiltration of corrosive slag and fume into the joints.

The foregoing and other problems have become even more disturbing, as present-day refractory technology has moved towards higher density and lower porosity in ceramically bonded or burned brick. The increased density and decreased porosity of the brick have tended to retard the degree of impregnation.

It is an object of this invention to provide for the manufacture of tar or pitch-impregnated, ceramically bonded, refractory shapes characterized by complete impregnation throughout all internal interstices, and by substantial freedom of any exterior pitch or tar buildup or coating of appreciable thickness. By "substantial freedom" we mean, for example, in a stack of 2½ to 4½ inch thick brick ten high, the exterior coating does not exceed about ½ inch, total for the entire stack.

Briefly, according to the preferred embodiment of this invention, a ceramically bonded, burned, basic refractory brick consisting of at least about 95% MgO, by weight and on the basis of an oxide analysis, is impregnated throughout with a nonaqueous, carbonaceous pitch or tar having the following characteristics:

Softening point: Cube in water—about 130 to 165, preferably 155° F.
Carbon disulfide insolubles (CDI): 8 to 18.5%, preferably about 15%.
Distillation tests: 0% in the range 0 to 300° C.; 0% in the range 0 to 315° C.; 1 to 4% in the range 0 to 335° C.; and a maximum of 13% in the range 0–335° C.

The steps of impregnating the brick are preferably carried out according to the techniques disclosed and claimed in the copending application of Weaver, Serial No. 215,140, filed August 6, 1962, entitled "Impregnation" and owned by the assignee of the present invention. The preferred brick is one made according to the teachings of our United States Patent No. 3,141,790, entitled "Burned Basic Refractory Shapes," and dated July 21, 1964.

The most critical feature of the pitch of the brick of this invention is the carbon disulfide insolubles (CDI). It is essential that they not exceed about 18.5% maximum, as determined by ASTM tests (Library Designation ASTM 1958, Hartford, page 901).

The brick of this invention, before impregnation, preferably have a porosity of less than about 15%, which is considerably less porous than more conventional burned brick. As noted, the preferred brick have an MgO content of at least about 95%. Brick having between 70 and 95% MgO are also useful. Likewise, very high purity, burned, dolomite brick can be used to manufacture the brick of this invention. By "high purity," we mean dolomite brick having no more than about 4% constituents other than MgO and CaO, by weight, on an oxide basis.

We are not entirely sure why the pitch used in the practice of our invention must be so critically controlled as to CDI. We know that when about 18.5% is exceeded, unsatisfactory brick are produced. We theorize that the CDI number, is indicative of the presence of rather high molecular weight carbon compounds in the pitch. It would seem that the ceramically bonded brick, particularly when the porosity falls below about 20%, serve as molecular sieves to screen out these higher melting point, large diameter, carbon compounds. This screened out material builds up as a very thick skin or scum around exterior surfaces of the brick. In actual tests, we have found this skin to contain pitch which melts at temperatures over 300° F. Still further, sometimes undesirable mineral impurities in the tar or pitch tend to build up in this skin, making resulting brick even less desirable in ferruginous environments.

In the process of impregnating refractory brick with pitch, it is not only important to fill the pore structure with pitch, but it is equally important that the surfaces be uniformly covered with a controlled amount of scum. To appreciate how we have accomplished this dual operation and to understand the nature of our invention, the pitch can be visualized as a colloidal suspension, and the refractory can be visualized as a filter. The amount of scum that will form on the surface of the refractory is related to the size of the colloidal particles in the pitch and the size of the continuous pore structure of the refractory.

In order for the colloidal particles in the pitch to enter the pore structure of the brick and not be retained on the brick surface, the diameter of the colloidal particles must be a small fraction of the continuous pore diameter of the brick. This fraction is not exactly known but, when dealing with large particles, it is generally recognized that they should be ⅛ to ⅒ the size of the opening if bridging is to be avoided. The pore diameters of refractories can vary a good deal, depending on brick composition, method of manufacture, and the temperature of burning. They can be measured by normal microscopic methods but only with great difficulty. In a number of studies of pore diameters in high purity magnesite brick, values of 20 to 100 microns have been observed.

No satisfactory method has been found by us to directly measure the size of the apparent colloidal particles in the pitch but some good indirect data were developed. Specifically a relation was found between the scum forming tendencies and the percentage of the pitch that is insoluble in carbon disulfide. We discovered that magnesite brick, impregnated with pitch with a "carbon disulfide insoluble" value (CDI) greater than a given value, develop a thick and non-uniform scum, which makes the brick unsuitable for use. A study of this surface scum on the brick revealed that its CDI value was far greater than that of the original pitch. For example, a pitch used for impregnating a magnesite brick had a CDI of 21.5%. A heavy scum that was filtered out on the surface of the brick had a CDI value of 53.5%. Subsequently, the discovery was made that the thickness of the scum could be made to vary as the percentage of CDI in the pitch varied. Finally, sufficient control of the CDI could be exercised to put a thin, but controlled, thickness of scum on the surface of a given brick. This turned out to have great practical value, as this controlled thickness of scum could be used as an expansion joint between brick when they were installed in the furnace.

It should not be inferred from this discussion that a single pitch is suitable for impregnation of all brick. While the percentage of CDI in the pitch appears to be the dominant factor in controlling the thickness of the scum on the brick, the pore diameter also has an important, but lesser, effect. Normally, as the pore diameter becomes smaller, then the percentage of CDI should be less, if a given thickness of scum is to be maintained. In any event, by controlling the CDI value, in the range 8 to 18.5, satisfactory brick are obtained.

Properties of the pitch, other than CDI, such as softening point and Conradson coking value, are also important in selecting a pitch for impregnation. If the softening point of the pitch is too low, the surface of the brick will be tacky or sticky and cause the brick to adhere to each other and to the pallet during shipment. If the Conradson coking value is low, the very purpose for impregnating the brick with pitch (which is to put carbon into the brick) is partially defeated. The CDI softening point, and Conradson coking value are all interrelated, and no large change could be made in one without affecting the others. To broadly define the type of pitch satisfactory for impregnating brick its CDI should be less than 18.5%, its softening point should be greater than 130° F., and the Conradson coking value should be as high as practical and, preferably, at least 40, although this latter value may not be practical with certain pitches of low softening point and low CDI.

Having thus described the invention in detail and with sufficient particularly as to enable those skilled in the art to practice it, what is desired to have protected by Letters Patent is set forth in the following claims.

We claim:
1. A burned, ceramically bonded, refractory shape impregnated throughout with a nonaqueous, carbonaceous material having the following characteristics:

Softening point _____ Cube in water—about 130 to 165° F.
Carbon disulfide insolubles _____ 8 to 18.5%

2. A burned, ceramically bonded, refractory shape impregnated throughout with a nonaqueous, carbonaceous material having the following characteristics:

Softening point _____ Cube in water—155° F.
Carbon disulfide insolubles _____ About 15%.
Distillation tests _____ 0% in the range 0–300° C.;
    0% in the range 0–315° C.;
    1–4% in the range 0–335° C.;
    and a maximum of 13% in the range 0–355° C.

3. A burned, ceramically bonded, basic refractory shape impregnated throughout with a nonaqueous, carbonaceous material having the following characteristics:

Softening point _____ Cube in water—about 130 to 165° F.
Carbon disulfide insolubles _____ 8–18.5%.
Distillation tests _____ 0% in the range 0–300° C.;
    0% in the range 0–315° C.;
    1–4% in the range 0–335°C.;
    and a maximum of 13% in the range 0–355° C.

4. A burned, ceramically bonded, basic refractory brick having at least about 95% MgO content and being impregnated throughout with nonaqueous, carbonaceous material having the following characteristics:

Softening point _____ Cube in water—about 130 to 165° F.
Carbon disulfide insolubles _____ 8–18.5%.
Distillation tests _____ 0% in the range 0–300° C.;
    0% in the range 0–315° C.;
    1–4% in the range 0–335°C.;
    and a maximum of 13% in the range 0–355° C.

5. A burned, ceramically bonded, basic refractory brick substantially entirely fabricated of dead burned dolomite grain and being impregnated throughout with a nonaqueous, carbonaceous material having the following characteristics:

Softening point _____ Cube in water—about 130 to 165° F.
Carbon disulfide insolubles _____ 8–18.5%.

6. A burned, ceramically bonded, basic refractory brick having at least 70 to less than about 95%, by weight, MgO content on an oxide basis, and being impregnated throughout with nonaqueous, carbonaceous material having the following characteristics:

Softening point _____ Cube in water—about 130 to 165° F.
Carbon disulfide insolubles _____ 8–18.5%.

References Cited by the Examiner

UNITED STATES PATENTS

| | | | |
|---|---|---|---|
| 3,106,475 | 10/1963 | Davies et al. | 106—58 |
| 3,141,790 | 7/1964 | Davies et al. | 106—58 |
| 3,215,546 | 11/1965 | Wilson et al. | 106—58 |

TOBIAS E. LEVOW, *Primary Examiner.*

J. POER, *Assistant Examiner.*